United States Patent [19]

Steinetz et al.

[11] Patent Number: 5,082,293
[45] Date of Patent: Jan. 21, 1992

[54] HIGH TEMPERATURE, FLEXIBLE, FIBER-PREFORM SEAL

[75] Inventors: Bruce M. Steinetz, Broadview Hts.; Paul J. Strocky, Middleburg Hts., both of Ohio

[73] Assignee: The United States of America as represented by the Administrator of the National Aeronautics and Space Administration, Washington, D.C.

[21] Appl. No.: 610,879

[22] Filed: Nov. 9, 1990

[51] Int. Cl.$^5$ .................. F16J 15/46; B64D 33/04
[52] U.S. Cl. ..................... 277/3; 239/265.11; 277/34; 277/76; 277/229; 277/234
[58] Field of Search .................. 277/27, 34, 34.3, 34.6, 277/76, 226, 229, 230, DIG. 6; 239/265.11, 265.19, 265.33, 265.37, 265.39; 202/248, 269

[56] References Cited

U.S. PATENT DOCUMENTS

| | | | |
|---|---|---|---|
| 795,098 | 7/1905 | Bricker | 277/229 |
| 972,680 | 10/1910 | Cole | 277/229 X |
| 1,078,333 | 11/1913 | Cole | 277/229 |
| 1,271,526 | 7/1918 | Crane et al. | 277/229 |
| 2,535,634 | 12/1950 | Hubbard . | |
| 2,895,759 | 7/1959 | Conrad et al. | 277/229 X |
| 3,020,185 | 2/1962 | Moffitt, Jr. et al. | 277/229 X |
| 3,206,229 | 9/1965 | Kramer | 277/230 X |
| 3,671,048 | 6/1972 | Gyory et al. . | |
| 3,894,742 | 7/1975 | Trelease . | |
| 4,098,076 | 7/1978 | Young et al. | 239/265.19 X |
| 4,129,307 | 12/1978 | Nishiura et al. | 277/34.3 |
| 4,156,533 | 5/1979 | Close et al. | 277/229 |
| 4,219,203 | 8/1980 | Bellavia, Jr. et al. | 277/229 X |
| 4,305,591 | 12/1981 | deSivry et al. | 277/230 X |
| 4,399,317 | 8/1983 | Van Dyk, Jr. | 277/34 X |
| 4,441,726 | 4/1984 | Uhl | 277/230 |
| 4,453,723 | 6/1984 | Greenwald | 277/229 X |
| 4,524,982 | 6/1985 | Hertz, Jr. | 277/230 X |
| 4,917,302 | 4/1990 | Steinetz et al. | 277/34 X |
| 5,014,917 | 5/1991 | Sirocky et al. | 277/229 X |

FOREIGN PATENT DOCUMENTS

| | | | |
|---|---|---|---|
| 2654375 | 4/1978 | Fed. Rep. of Germany | 277/34.3 |
| 1450730 | 9/1976 | United Kingdom | 277/230 |

OTHER PUBLICATIONS

"Thermal Barrier Gas Seal" (article): from NASA Tech. Briefs; vol. 5, No. 2, pp. 238–239, Summer 1980.
"Nextel ®" Product Bulletin, 3-M Company (no date given).

Primary Examiner—William A. Cuchlinski, Jr.
Assistant Examiner—Scott W. Cummings
Attorney, Agent, or Firm—Gene E. Shook; John R. Manning; James A. Mackin

[57] ABSTRACT

A seal is mounted in a rectangular groove in a moveable structural panel. The seal comprises a fiber-preform constructed of multiple layers of fiber having a uniaxial core. Helical fibers are wound over the core. The fibers are of materials capable of withstanding high temperatures and are both left-hand and right-hand wound. An outer layer wrapped over said helical fibers prevents abrasion damage.

18 Claims, 4 Drawing Sheets

HIGH TEMPERATURE, FLEXIBLE, FIBER-PREFORM SEAL

ORIGIN OF THE INVENTION

The invention described was made by an employee of the U.S. Government together with a contractor employee performing work under a NASA contract and is subject to the provisions of Section 305 of the National Aeronautics and Space Act 1958, Public Law 85-568 (72 Statute 435; 42 USC 2457).

TECHNICAL FIELD

This invention is concerned with an improved flexible thermal barrier seal for operation at high temperatures. The invention is particularly concerned with sealing gaps between movable engine panels and their adjacent engine sidewalls typical of advanced ramjet-scramjet engines as well as two-dimensional turbojet exhaust nozzles.

Gaps caused by pressure and thermal loads on the weight-minimized relatively compliant engine sidewalls of these hypersonic engines may be as much as 0.25 inch which requires a very compliant "serpentine" seal to conform with the sidewall deformations. Complicating the seal's function is the requirement to articulate the engine panel and seal wiping the seal over bowed engine sidewalls while the engine is operating. Articulation of the engine panel is required to optimize engine and vehicle performance.

Flow path conditions within these engines are extreme with static gas temperatures ranging from 1200° F. to 5000° F. High pressure differentials up to 100 psi may be encountered, depending on engine configuration and axial flow path position within each engine.

It is, therefore, a primary object of the present engine to prevent these hot, pressurized flow path gases containing hydrogen and oxygen from leaking past movable engine panels to back engine cavities thereby causing loss of the engine or even the entire aircraft.

A further object of the invention is to provide a seal which conforms to expected engine sidewall distortions.

Another object of the invention is to provide a high temperature, flexible seal which can operate at temperatures up to about 2300° F.

BACKGROUND ART

U.S. Pat. No. 3,671,048 discloses a lip type seal including a non-woven mat in a sealing lip. The mat is fabricated of randomly disposed interconnected fibers composed of a low friction polymer impregnated with elastomeric material.

U.S. Pat. No. 3,894,742 is concerned with a flexible, resilient, deterioration resistant seal that is capable of withstanding high temperatures and pressures. The seal is comprised of an inner core around which an inner and outer cover strip composed of thin metallic foil is spirally wound so as to enclose the entire core.

U.S. Pat. No. 4,917,302 describes a seal that includes a plurality of rectangular-shaped wafers stacked next to one another and preloaded in the axial direction to minimize leakage between wafers. The wafers are laterally preloaded to maintain sealing contact along the wafer faces which engage the adjacent wall.

U.S. Patent Ser. No. 441,672 which was filed by the NASA Administrator on Nov. 27, 1989, and issued as U.S. Pat. No 5,014,917 on 5/14/91, is directed to a high temperature, flexible, thermal barrier seal which comprises a high temperature outer sheathing with an inner core of densely packed, high temperature particles. The thermal barrier seal is preloaded lateral to its axis to maintain good sealing contact between the seal nose and the adjacent wall, as well as to ensure the seal follows the distorted sidewall.

DISCLOSURE OF THE INVENTION

A high temperature, flexible seal constructed in accordance with the present invention comprises multiple layers of fibers having a uniaxial core over which helical fibers are wound. The fibers are of materials capable of withstanding high temperatures and are both left-hand and right-hand wound.

The fibers are made of alumina-boria-silicate, silicon carbide or other suitable high temperature materials. A wire tube may be provided in the center of the seal through which a coolant gas may be passed. Also, the fibers may have noncircular cross-sections.

BRIEF DESCRIPTION OF THE DRAWINGS

The objects, advantages and novel features of the invention will be more fully apparent from the following detailed description when read in connection with the accompanying drawings wherein.

BEST MODE FOR CARRYING OUT THE INVENTION

Figure 1:
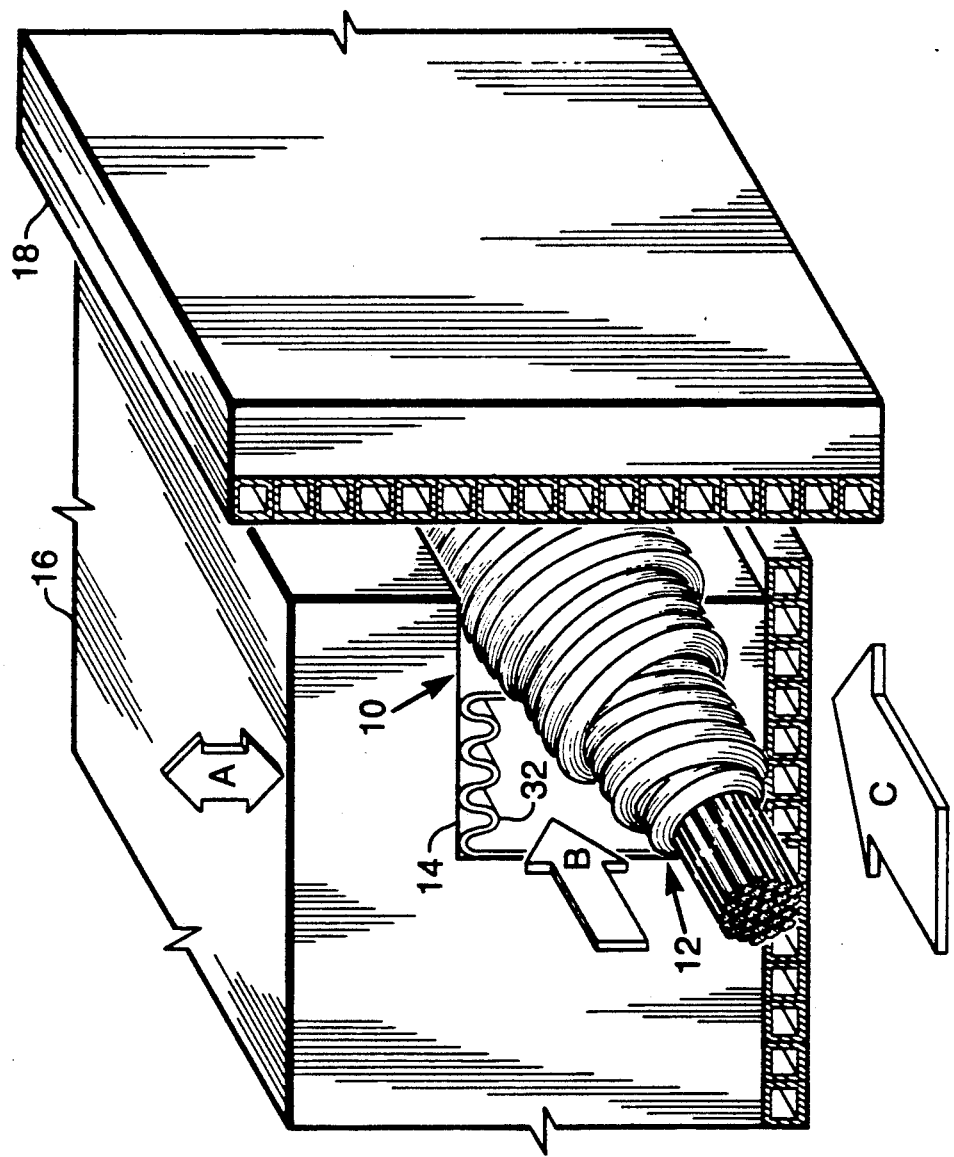
FIG. 1 is a perspective view of a high temperature, flexible fiber-preform seal constructed in accordance with the invention.

Referring now to the drawings, there is shown in FIG. 1 a seal 10 comprising a fiber preform 12 mounted in a rectangular groove 14 along the side of a movable engine panel 16. The arrow A indicates the direction of motion of the panel 16 and the seal 10 as they traverse the adjacent sidewall 18. The fiber preform seal prevents high temperature, high pressure engine flowpath gases depicted by arrow "C" from leaking through the interface between the panel 16 and sidewall 18.

Figure 2:
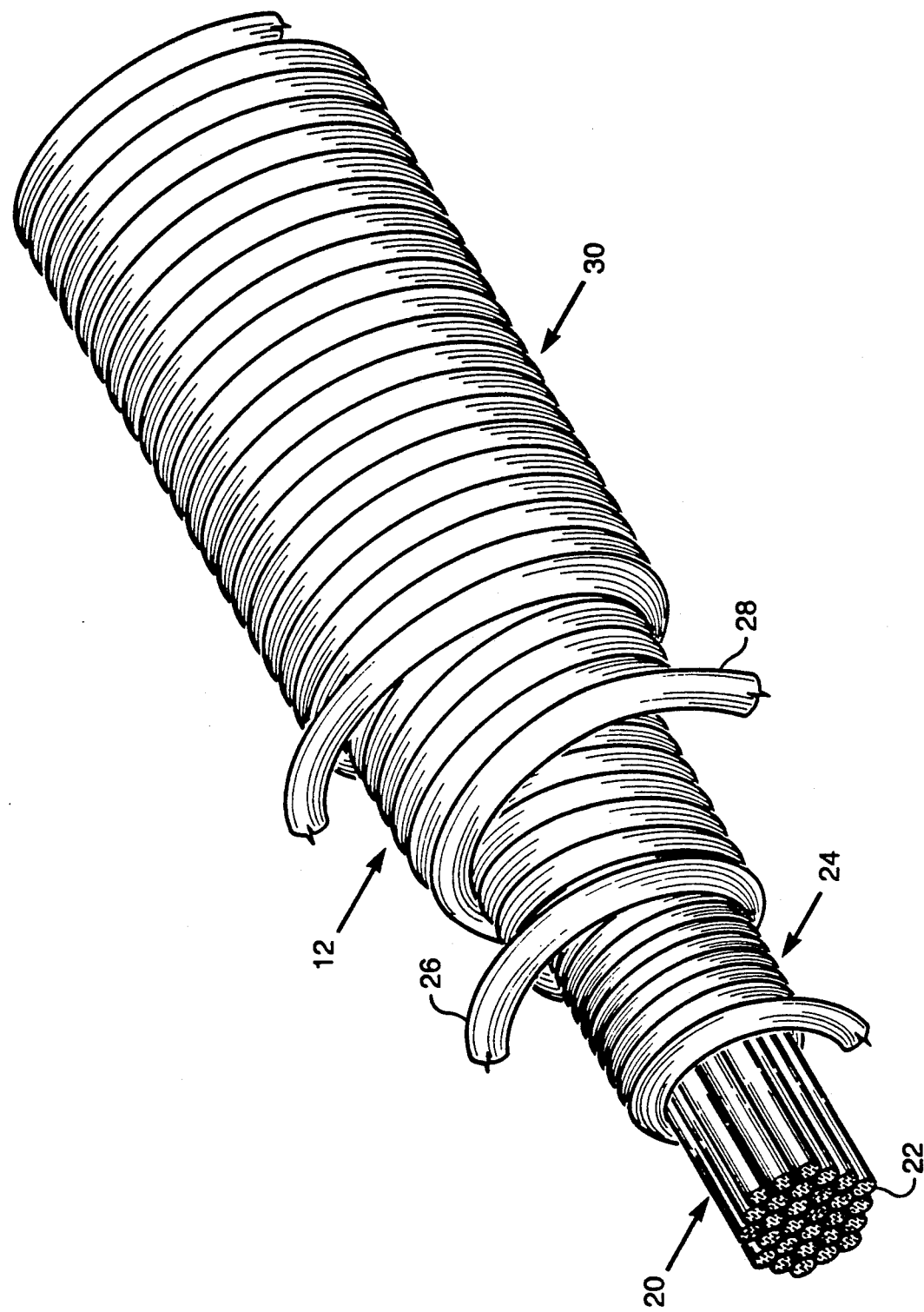
FIG. 2 is an enlarged, perspective view showing a uniaxial fiber core having right and left-hand helical fibers wound thereover with the fiber diameters enlarged for clarity.

Referring now to FIG. 2, there is shown the detailed basic construction of the fiber preform 12 that is constructed of multiple layers of fibers that are layed-in or wound in an optimal configuration to minimize leakage or permeability of the seal structure. The fiber-preform 12 comprises a uniaxial core 20 of a plurality of fibers 22 that are substantially parallel and contiguous to one another. An internal layer 24 of spiralwound fibers encircles the core 20 at approximately 90°. A plurality of left-hand and right-hand helical fibers 26 and 28 encircle the internal layer 24. An external layer 30 of spiral-wound fibers encircles the left and right-hand helical fibers at approximately 90°.

The volume percent of the uniaxial or zero degree fibers 22 in the core 20 and the right and left-hand helical fibers 26 and 28, and the internal 24 and external 30 spiral-wound (90°) fibers can be optimized for a given application to meet both minimum permeability and minimum bend radius constraints. More particularly, increasing the relative percent of the uniaxial fibers 22 in the core 20 will decrease fiber preform permeability, but this will increase the bending stiffness. Conversely, decreasing the percent of the uniaxial fibers 22 in the core 20 increases the compliance of the structure for applications where it is necessary to bend the seal 12 around a radius.

It is evident from FIG. 2 that the preform 12 is constructed of a multi-strand uniaxial core 20 and multiple external spiral-wound (approximately 90°) circular wraps made of alumina-boria-silicate fibers. It has been found that the seal can easily accommodate a 0.75 inch bend radius which is an important design feature of a structure that must seal around the perimeter of a rectangular engine panel with minimum corner radii. A small bending radius is also key in forming a high temperature shaft seal. This is important for forming a panel hinge seal.

Adding left-hand or right-hand helical wraps of fibers increases the sheer strength of the seal to structurally withstand the punishing sliding condition as the seal traverses the highly distorted sidewall 18. These inner helical wraps also cause a more tortuous gas path which reduces gas leakage through the seal. The wound fibers are drawn tight to improve the packing density of and reduce leakage through the inner, uniaxial fibers 22 in the core 20.

Referring again to FIG. 1, the preform 12 is mounted in the closely mating seal channel or rectangular groove 14 in the movable structural panel 16 of an advanced hypersonic engine or the like. This seals the gap between the movable engine panel 16 and the adjacent engine splitter wall or sidewall 18.

The seal is positively preloaded against the adjacent engine sidewall 18 by a cooled, pressurized metal bellows 32. More particularly, the seal is preloaded lateral to its axis to maintain good sealing contact between the seal nose and the adjacent wall thereby making certain the seal follows the distorted wall. This pressurization is achieved by the introduction of a pressurizing gas indicated by the arrow B in FIG. 1.

The materials chosen for the seal are preferably high temperature engineering fibers such as alumina-boria-silicate sold commercially as "Nextel", or silicon-carbide, sold commercially as "Nicalon." These fibers remain flexible when hot, and they offer high operating temperatures (up to 2300° F. in the case of alumina-boria-silicate) that minimize the need for active coolant of the seals. Also, these materials are resistant to chemical attack by hydrogen and oxygen present in the flow-path gases whose direction is indicated by the arrow C.

DESCRIPTION OF AN ALTERNATE EMBODIMENT

Figure 3:
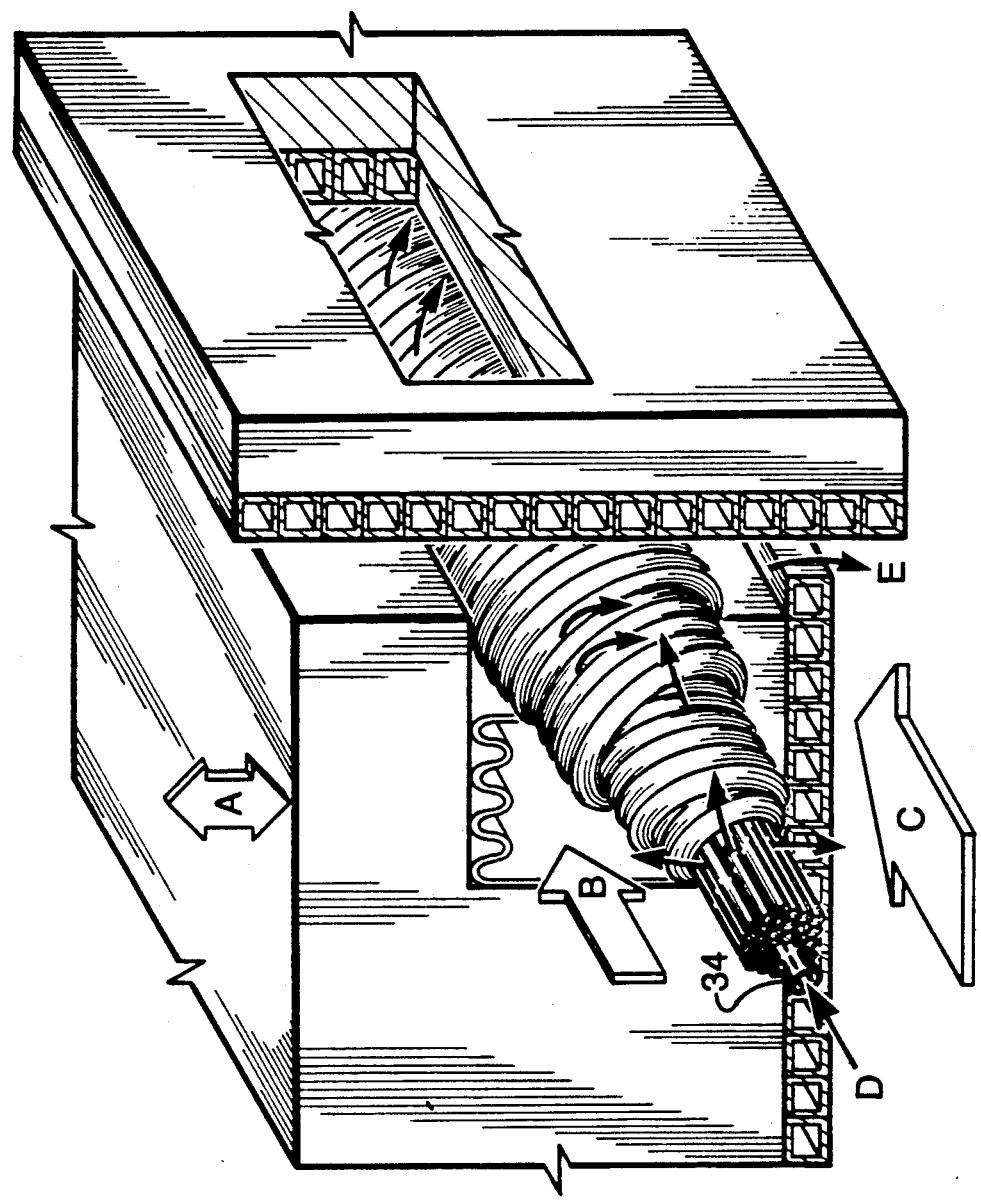
FIG. 3 is a perspective view of an alternate embodiment of the high temperature, flexible seal embodying the coolant and internal pressurization features of the invention.

Referring now to FIG. 3, there is shown one of several alternate embodiments of the present invention. This embodiment incorporates a porous "Incomen" wire tube 34 in the center of the seal through which a seal purge gas can be flowed as shown by the arrow D. The seal purge gas pressure inflates the seal structure increasing preload and enhancing sealing contact with the adjacent seal surfaces. The use of this central cooling tube is required at axial engine stations where gas temperatures exceed the maximum use temperature of the seal.

The cooling tube 34 is designed to serve as a manifold for delivering higher pressure coolant gas at engine stations where the engine temperatures are higher. Inert purge coolant gases, such as helium, flowing radially outward through the wall of the seal, as indicated by the arrows E, serve two important functions. The gas cools the seals, and it provides a positive purge of an inert gas to prevent leakage of potentially explosive hydrogen-oxygen mixtures to the back side engine cavities.

Figure 4:
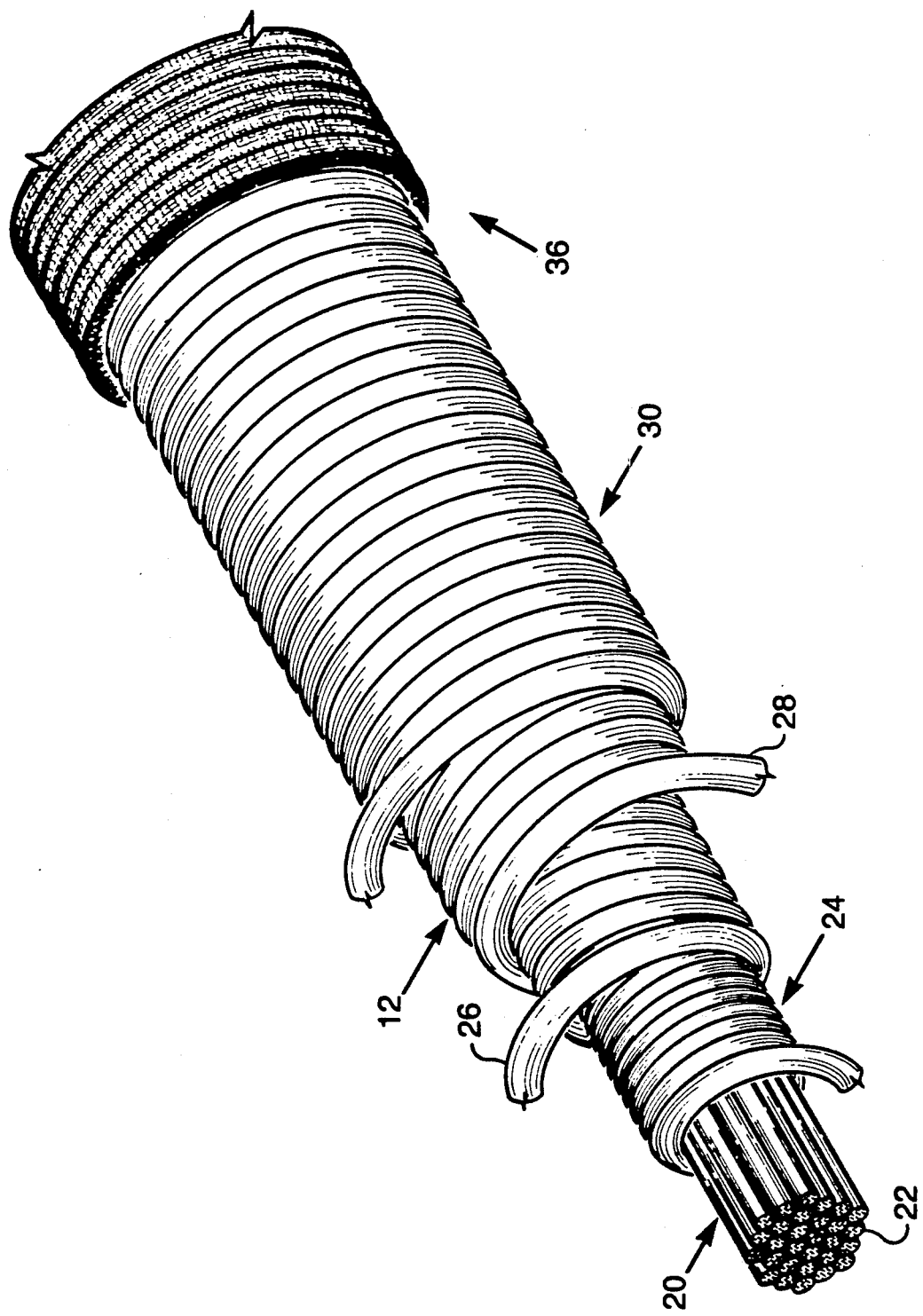
FIG. 4 is an enlarged perspective view similar to FIG. 2 showing an alternate embodiment of the invention.

The embodiment shown in FIG. 4 has a high temperature braided or woven ceramic sleeve 36 which forms an outer sheath that covers the external layer of fibers of the preform 12. After the preform 12 is inserted into the sleeve 36 the assembly is positioned in the rectangular groove 14 shown in FIG. 1. The sleeve 36 is formed using three-dimensional standard braiding techniques and forms a layer at the sealing contact that resists abrasion as the preform 12 slides across the adjacent sidewall 18.

The sleeve 36 is constructed from a plain braid of alumina-boria-silicate yarns having a thickness of about 0.1 in. These ceramic fibers in the sleeve 36 maintain strength and flexibility at elevated temperatures. It is contemplated that other sleeve construction techniques and thicknesses can be used to optimize leakage performance.

It will be appreciated that the main elements of the seal shown in FIGS. 1 and 3 are fiber material, fiber diameters or cross-sections, layup of the fibers, and the number of or relative proportions of the axial, left-hand helical, right-hand helical, and spiral-wound internal and external fiber layers, and the lateral preload. All of these parameters can be optimize for given seal application. The lateral preload can be omitted for applications with minimal distortion requirements.

In addition to the uses of the seals shown in FIGS. 1 and 3, it is contemplated that the seals can be used in hypersonic vehicle airframe seals, such as landing gear door seals, elevon control surface seals, rudder control surface seals, body-flap control surface seals, forward canard control surface seals, and crew access door seals.

It is further contemplated that the disclosed seal can be used in high temperature furnace expansion joints and the like where furnace panel growth is encountered. The seal may also be used in rocket motor casings or any other application requiring non-asbestos, high temperature gaskets.

Other applications contemplated for this seal include the following: Sealing structural interfaces or flange connections in the chemical or oil industries where the highly corrosive environment may disqualify standard polymeric or metal seals but where ceramics will survive. The disclosed high temperature seal can also be used to seal joints of ceramic heat exchangers of advanced recuperators being developed to extract usable energy from high temperature (up to 2300° F.) flue-gas that would otherwise be lost up the stack.

While several embodiments of the invention have been shown and described, it will be appreciated that various structural modifications may be made to the seals without departing from the spirit of the invention of the scope of the subjoined claims. By way of example, it is contemplated that non-circular cross-section fibers may be utilized for the more circular cross-sectional fibers. Using square fibers, for instance, increases theoretical packing densities from 78% to nearly an ideal 100% and will reduce leakage significantly. These new cross-sections, which may be square or rectangular fibers, are being processed by a melt assisted extrusion as a key part of a spinning process.

We claim:

1. Apparatus for sealing a gap between a movable panel and an adjacent sidewall spaced therefrom to inhibit leakage of gases from a high pressure side to a low pressure side, said apparatus comprising
multiple layers of fiber in said gap forming a fiber-preform seal including a uniaxial core with helical fibers wound over the same, and
means for applying a pressure toward said sidewall to a portion of said helical fibers to form a seal between said sidewall and another portion of said helical fibers.

2. Sealing apparatus as claimed in claim 1 wherein the panel and sidewall are on a ramjet engine and the surface of the sidewall is distorted during operation of the same.

3. Sealing apparatus as claimed in claim 2 wherein static gas temperatures within said engine are up to about 2300°F.

4. Sealing apparatus as claimed in claim 1 wherein the panel and sidewall are on a scramjet engine and the surface of the sidewall is distorted during operation of the same.

5. Sealing apparatus as claimed in claim 1 including both right and left-hand helical fibers wound over said core.

6. Sealing apparatus as claimed in claim 5 wherein the fibers are of a material capable of withstanding temperature up to about 2300° F.

7. Sealing apparatus as claimed in claim 6 wherein the fibers are alumina-boria-silicate.

8. Sealing apparatus as claimed in claim 6 wherein the fibers are silicon carbide.

9. Sealing apparatus as claimed in claim 1 including means in the center of said seal for cooling the same.

10. Sealing apparatus as claimed in claim 9 wherein said cooling means comprises a porous tube for conveying a coolant gas in center of the seal.

11. Sealing apparatus as claimed in claim 1 wherein the fibers have noncircular cross-sections.

12. Sealing apparatus as claimed in claim 1 including an abrasion-resistant layer between said fiber-preform seal and said sidewall.

13. Sealing apparatus as claimed in claim 12 wherein the abrasion-resistant layer is constructed from a braid of alumina-boria-silicate yarns.

14. Sealing apparatus as claimed in claim 13 wherein the yarns have a thickness of about 0.1 in.

15. In flexible seal for inhibiting leakage of gases through a gap between a movable panel and an adjacent sidewall when said sidewall becomes significantly distorted in which passage of gases is blocked by a plurality of fibers, the improvement comprising
a groove along the side of said movable panel adjacent to said gap for mounting said fibers in multiple layers forming a fiber-preform seal including a uniaxial core with said fibers wound over the same, and
means for urging said fiber-preform in a direction toward said sidewall, said means including a bellows in said groove for moving said fiber-preforms toward said sidewall with a predetermined preload.

16. A flexible seal as claimed in claim 15 including means for introducing a pressurizing gas in said bellows.

17. In flexible seal for inhibiting leakage of gases through a gap between a movable panel and an adjacent sidewall when said sidewall becomes significantly distorted in which passage of gases is blocked by a plurality of fibers, the improvement comprising
a groove along the side of said movable panel adjacent to said gap for mounting said fibers in multiple layers forming a fiber-preform seal including a uniaxial core with said fibers wound over the same.
a bellows for urging said fiber-preform in a direction toward said sidewall, and
an abrasion resistant layer between said fiber-preform and said sidewall.

18. A flexible seal as claimed in claimed in claim 17 wherein the abrasion-resistant layer is constructed from a braid of alumina-broia-silicate yarns.

* * * * *